Aug. 28, 1962
P. LANDRUM
3,050,965
COUPLING
Filed Nov. 4, 1960
3 Sheets-Sheet 1
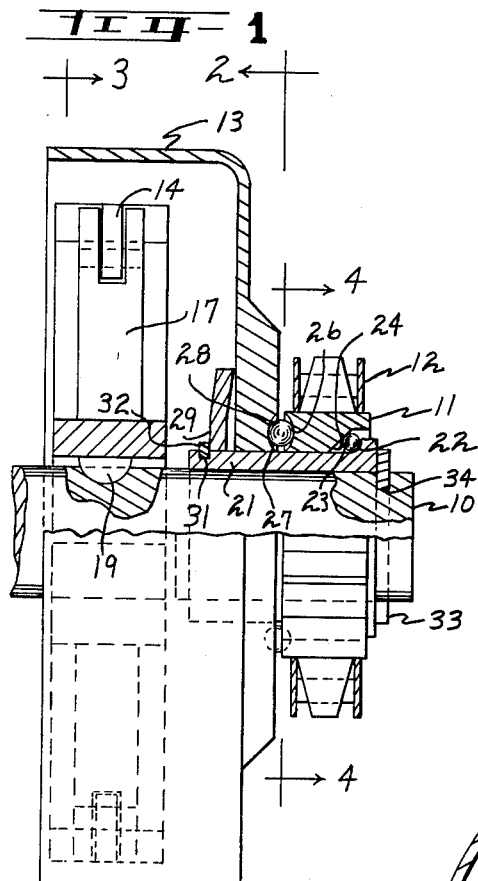
INVENTOR.
Porter Landrum
BY
Jennings, Carter & Thompson
Attorneys

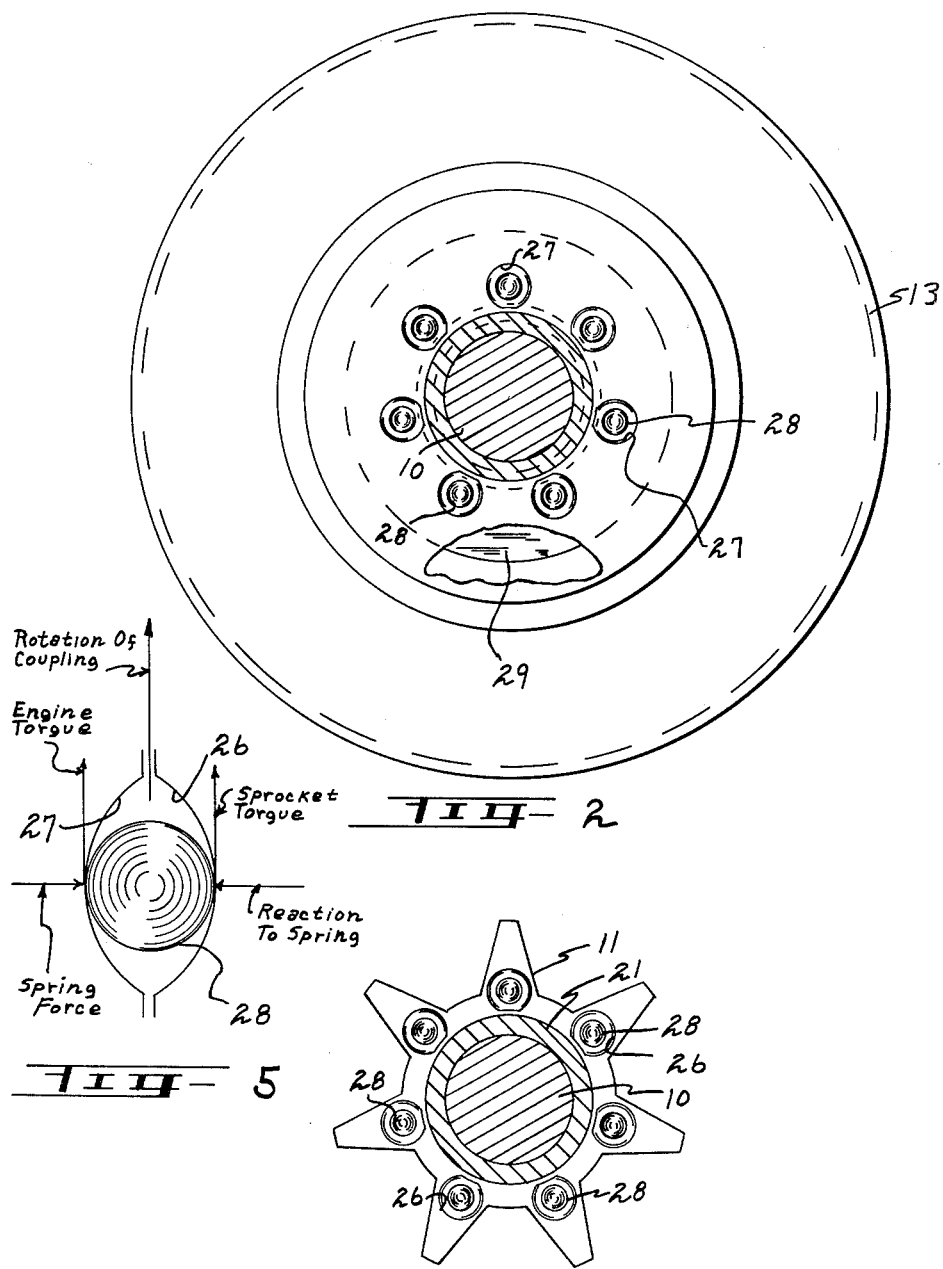

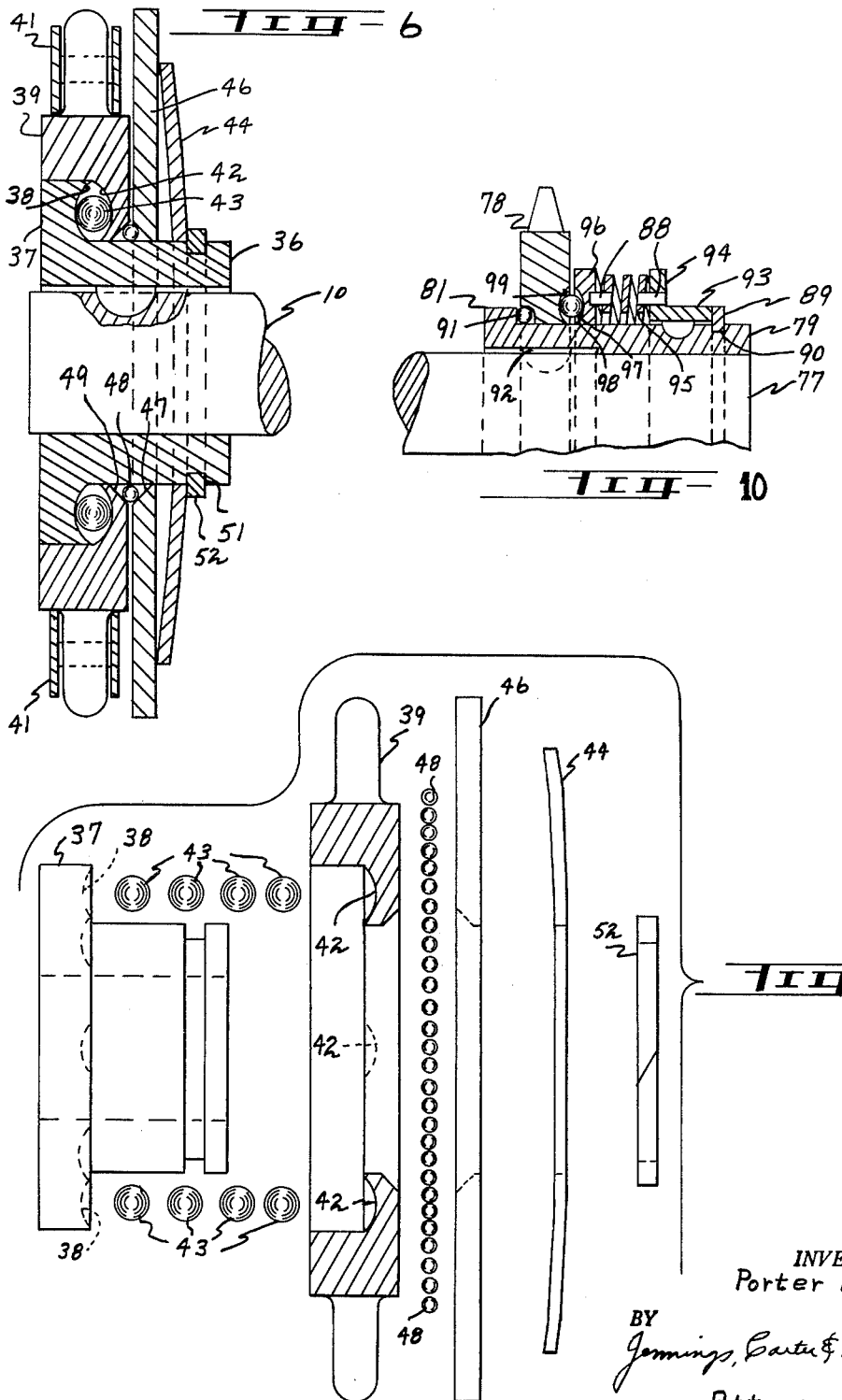

United States Patent Office 3,050,965
Patented Aug. 28, 1962

3,050,965
COUPLING
Porter Landrum, 7225 2nd Ave. S., Birmingham 6, Ala.
Filed Nov. 4, 1960, Ser. No. 67,336
4 Claims. (Cl. 64—29)

This invention relates to couplings for connecting driving and driven members and has for an object the provision of a power transmitting coupling effective to cushion shock loads on either the driving or driven shaft.

In the art to which this invention relates, there are many instances in which the performance or drives can be materially improved by reducing the shock loads existing in the moving system. For example, in chain saws of the portable type which are driven by small gasoline engines, generally two-cycle engines, direct connection of the engine to the chain results in a tremendous number of recurring shocks on the parts. While these shocks are of short duration, the loads under shock conditions may be extremely high. Further, with no resiliency in such drive the power stroke of the engine is expended in direct opposition to many such loads, further accentuating the loads and causing undue wear both on the engine, sprocket chain, and associated parts. Even in the case of two-cylinder or four-cylinder engines, either two cycle or four-cycle, there are shock loads and vibrations which are undesirable and which cause undue wear on the driven parts as well as on the engine itself. Still further, even when using electric prime movers certain types of loads produce high frequency shocks in the drive.

In view of the foregoing it is the prime object of my invention to provide a coupling which, while providing a resilient driving connection between driving and driven shafts or other apparatus, also has the capacity of quick, low inertia recovery, thus to smooth out the flow of power and reduce shock and vibration.

My invention contemplates a coupling having one part secured to a driving shaft such as the shaft of an engine or motor, the other part being connected to the load to be driven. The two principal parts of the coupling are mounted for limited relative rotation and are strongly, but resiliently biased toward each other by some form of resilient spring means. Between the parts are anti-friction wedges, preferably in the form of steel balls seated in spherical bottom seats formed in the adjacent faces of the two parts. Whenever shock loads occur, such as those occasioned by the power impulse from the engine or resistance from the load, the parts rotate slightly relative to each other. Such rotation further compresses the spring loading means, thus cushioning the drive. As will appear, the spring employed in my invention does not itself transmit the torque; it serves only to resist relative rotation of the parts with a force which increases in magnitude in accordance with the amount of relative rotation between the coupling parts. Thus, in my improved coupling there is no winding of springs or twisting of rubber members. The inertia of the parts of my improved coupling is therefore very low, resulting in its ability efficently and quickly to absorb the high frequency shocks which exist in many drives. As the description proceeds it will also become apparent that in combination with the anti-friction, rolling wedges, my improved coupling is substantially free of internal friction, thus further aiding in quick recovery after the application of a shock load.

Apparatus illustrating features of my invention is shown in the accompanying drawings, forming a part of this application, in which:

FIG. 1 is a side elevational view, partly broken away and in section, and showing my invention associated with a centrifugal type of clutch drive;

FIG. 2 is a detail sectional view taken generally along line 2—2 of FIG. 1;

FIG. 3 is a detail sectional view reduced in size, taken generally along line 3—3 of FIG. 1;

FIG. 4 is a detail sectional view taken generally along line 4—4 of FIG. 1, with the chain removed;

FIG. 5 is a wholly diagrammatic force diagram;

FIG. 6 is a vertical sectional view through a modified form of my invention;

FIG. 7 is a somewhat diagrammatic exploded view, partly in section, of the coupling shown in FIG. 6;

FIG. 8 is a detail sectional view taken generally along line 8—8 of FIG. 9 and showing a still further modified form of my invention;

FIG. 9 is a detail sectional view taken generally along line 9—9 of FIG. 8; and, FIG. 10 is a half vertical sectional view of a still further modified form of my invention and showing the use of a coil spring therein.

Referring now to the drawings for a better understanding of my invention and more particularly to FIGS. 1 to 5, inclusive, I illustrate my improved coupling as being adapted to transmit power from a shaft 10 to a sprocket 11. Thus, the shaft 10 may be the output or power shaft from an engine or motor, not shown. The sprocket 11 may have passing thereover a roller chain 12 or the like which leads to a load to be driven, not shown. For example, the chain 12 may be the tooth carrying chain of the usual internal combustion engine, portable, wood cutting saw.

In the embodiment illustrated my invention is shown incorporated with a centrifugal type of clutch. As is known, this type of clutch embodies an outer drum 13. The centrifugal shoes 14, see FIG. 3, are pivoted at 16 to an arm of a spider 17. The shoes are urged inwardly by springs 18. It will be understood that the spider is secured to the shaft 10 by a key 19. Thus, when the shaft 10 rotates the spider and centrifugal members 14 at a speed to overcome springs 18, the drum 13 is driven.

Surrounding the outer end of the shaft is a sleeve 21. The sleeve 21 is provided at 22 with a curved raceway for a series of balls 23.

The sprocket 11 has its bore machined at 24 to form a complementary seat for the other side of the ring of balls 23. Thus, insofar as the outer side of the sprocket is concerned it will be seen that it is supported for relative rotational movement with respect to sleeve 21 on the anti-friction ball bearings 23.

The opposite or inner surface of the sprocket 11 is provided with a plurality of equiangularly spaced, spherical bottom recesses 26. The adjacent boss portion of the drum 13 is provided with complementary spherical bottom recesses 27. In each of these pairs of recesses is a steel ball 28.

Surrounding sleeve 21 is a dished spring washer 29. The spring washer is held under predetermined pressure in an amount sufficient for the balls 28 to transmit torque from the drum to the sprocket. This is accomplished by locating in the outer surface of the sleeve 21 a groove 31, compressing the spring, and then holding the parts thus under compressive force by an angular retaining ring 32 fitting in the groove 31.

From what has just been described it will be seen that the drum 13, when the shoes 14 are in contact therewith, can be considered as the driving member of the coupling. It will be noted that the boss or central portion of the drum is loosely mounted about the sleeve and that consequently the drum is mounted for slight rotational movement relative to the sprocket 11. With the spring 29 exerting sufficient axial compression on balls 28 to transmit a given torque, it will be apparent that whenever the drum 13 is driven the sprocket also is driven. If it now be assumed that due to some pulsations of the power input of shaft 11, with consequent pulsations in the torque imparted to the drum 13, or, that there be some pulsations in the load driven through chain 12, the following action takes place: upon rotation of the drum 13 relative to the sprocket 11 the balls ride up into the shallower parts of the seats, tending to separate or force apart the drum and the sprocket. This further compresses spring 29, further loading it, thus providing in effect a resilient connection between the drum 13 and the sprocket 11.

It will be noted that the spring 29 is what might be termed a dished washer-like spring made of steel. Such a spring is called a "Bellville" spring. These springs may be purchased on the open market from sources such as Barnes-Gibson-Raymond Company, Detroit, Michigan.

It is to be especially noted that the drum is in effect "locked" to the sprocket 11, in resilient manner, by the spring 29, through the balls 28 and the sprockets 26 and 27. Thus, a spring 29 can be selected which will keep the balls 28 under compressive force through a range fully effective to transmit the horse power for which the coupling is designed up to a desired percentage of shock loads above and beyond that power range. When coupled with the anti-friction support such as the balls 23 it will be apparent that the sprocket 11 essentially "floats," and very little retarding friction due to the relative rotation of the sprocket and the drum is present. It may also be mentioned that the entire assembly of the sleeve 21, the drum, the spring, and the sprocket may be held on the shaft by means of an annular retaining ring 33 fitting in an annular groove 34 provided in the shaft. To remove the assembly it is only necessary to remove the retaining ring 33, whereupon the sleeve and all the other parts associated therewith slide off. It is to be especially noted that the weight of the parts forming the cushioning mechanism of my improved coupling can be very low and that they are located near the center of rotation of the entire system. Therefore, the recovery time for the balls to reseat in the very bottoms of the recesses 26 and 27 is extremely slight. Even with two cycle chain saws running at 8,000 r.p.m., I have found that a sprocket embodying the features of my invention as just described materially increases the available power, adds at least 50% to the life of the chain, and eliminates in large measure the vibration present in such saws. It will also be noted that each time the engine makes a power stroke, the tremendous power during the short fraction of a second is "stored" in the spring 29. This smooths out the flow of power from the engine.

Referring now particularly to FIG. 5, I show in diagrammatic manner the forces on the balls 28. It will be seen that the spherical bottom sockets 27, in the driving member 13 and the sockets 26 in the driven member, the sprocket 11, are larger in effective diameter than the diameter of the balls 28. The force of the spring 29, pushing through the hub of the drum 13, balls 23 and sprocket hub 11 of course is met by the reaction of the shoulder 22 indicated by the line labeled "reaction to spring" in FIG. 5. Therefore, the engine torque is adequately and evenly transmitted to the sprocket, through the balls 28, the force of the spring 29 serving to hold the members resiliently together. Relative axial movement of the drum and sprocket increases the force exerted by the spring.

Referring now particularly to FIGS. 6 and 7, I show a slightly modified form of mounting for a coupling embodying the features of my invention. In this instance the driving shaft 10 from the engine has keyed thereto a sleeve 36. Sleeve 36 is provided with an enlarged diameter shoulder portion 37 in which I provide a plurality of the spherical bottom recesses 38. These are spaced equiangularly about the inner face of the shoulder 37.

The sprocket 39 over which passes a chain 41 leading to the load to be driven, also is provided with complementary spherical bottom recesses 42. Balls 43 are provided for each of the pairs of sockets 38 and 42.

In order to eliminate any friction between the periphery of the "Bellville" type spring shown at 44 and the side of the sprocket 39, I interpose between these members a washer 46. The washer 46 may have a seat 47 adjacent its inner bore to fit against a series of small diameter balls 48. The inner bore of the sprockets 39 may be provided with a complementary seat 49. The sleeve 36 is provided with a groove 51 in which fits a retaining ring 52, effective to hold the spring compressed to the desired degree.

The operation of the modification just described is substantially as has already been described. Thus, power is transmitted from shaft 10, sleeve 36, recesses 38 therein, balls 43, recesses 42, thence to the sprocket. The force with which the balls 43 are compressed is applied through the spring 44, the washer 46, shoulder 47, the row of balls 48, and thence to the shoulder 49.

In those instances where no clutch is desired it will be seen that the form of coupling shown in FIGS. 6 and 7 is a simple, economical unit. Further, due to its axial compactness, in many commercial applications it is possible merely to remove an existing sprocket from a drive and to use in place thereof the entire assembly shown in these figures. All of the advantages heretofore mentioned are present in this construction.

In FIGS. 8 and 9 I show a still further form of a coupling embodying features of my invention. In this instance it is desired to provide a coupling capable of transmitting more torque than the single spring types just described. As shown in FIG. 9, I show a driving shaft 53 and a driven shaft 54. The shaft 53 may be provided with a large diameter shoulder part 56. Spherical bottom recesses 57 are provided in the face of the shoulder 56. Also, the end of the shaft 53 may be provided with a raceway 58 to receive a row of ball bearings 59. These bearings rest also in a complementary raceway 61 provided in a radial enlarged portion 62 on the end of shaft 54.

Passing through openings 63 in the enlargement 62 are a plurality of headed pins 64. The pins pass through arcuate slots 66 provided in the enlarged portion 56 carried by shaft 53. The pins in turn pass through bushings 67 provided in openings 68 in a disc 69.

Surrounding each of the pins 64 is one of the "Bellville" springs indicated at 71. The washers are held under partially compressed condition by means of an annular locking ring 72 and a washer 73 as illustrated.

The disc 69 is provided with the spherical bottom recesses 74, complementary in number and shape to recesses 57. In each pair of recesses is one of the steel balls 76.

It will be apparent that when power is applied to shaft 53, that shaft can rotate slightly relative to shaft 54. This is brought about by the balls 76 riding up into the shallower parts of the depressions 57 and 74, thus to compress the series of springs 71. It will be noted that the arcuate slots 66 permit this amount of relative rotational movement. Therefore, the advantages previously ascribed to the other constructions are present in the modification just described. The modification of FIGS. 8 and 9 is especially useful for the end-to-end coupling of relatively large shafts. It will be noted that the shafts remain axially fixed, the only axially movable part being the disc 69.

Referring to FIG. 10, I show a still further modified form of my invention in which it is possible to use a coil spring instead of the disc springs. The power shaft is indicated at 77 and a sprocket for driving the load is indicated at 78. A sleeve 79 has a right angle shouldered portion 81. A row of balls 91 is interposed between the sprocket and the portion 81. The sleeve 79 is keyed to the shaft 77 as indicated at 92. Keyed to the outer surface of the sleeve 79 is another sleeve 93 which has an annular outstanding shoulder portion 94.

Adjacent the side of the sprocket opposite balls 91 is a disc 96. The disc 96 is provided with the spherical bottom recesses 97 to receive balls 98, the side of the sprocket also being provided with the spherical bottom recesses indicated at 99.

Interposed between the disc 96 and the sleeve 93 is a coil spring 95. The spring is of a size and made of a material to give the desired compressive force on the balls when the parts are assembled by a retaining ring 89 fitting in a groove 90 of sleeve 79. The end flights of the spring may be fixed against rotating relative to the disc 96 and the shoulder 94 by pins 88. However, if a spring 95 is selected to exert sufficient force, little, if any, of the rotational force between the sleeve 93 and sprocket 78 will be transmitted due to "winding up" of the spring 95. That is to say, I provide the pins 88 more for the purpose of assuring against slippage of the spring relative to the disc 96 and shoulder 94 under sudden and extreme accelerations of the shaft 77 and consequently the sleeve 93.

The modification of FIG. 10 may be used where axial room is not at a premium.

From the foregoing it will be apparent that I have devised an improved coupling. In actual operation and as applied to a single cylinder, two-cycle, portable chain saw for felling trees, my invention has materially increased the life of the chain as well as reducing the vibrations imposed on the entire piece of equipment. It will likewise be apparent that the principles of my improved coupling may be applied to a large variety of installations. I have noted that even under low torque conditions, power transmission through a coupling designed to transmit five horse power was extremely smooth and vibration free. I attribute this to the fact that the spring pressure builds up in an ever increasing or logarithmic manner as the relative rotational movement between the driving and driven members increases.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. In a coupling, a driving shaft and a driven shaft arranged in an end-to-end relation and being aligned axially, a radially enlarged portion on each of said shafts, a disc about the driving shaft and disposed adjacent the radially enlarged portion of the driving shaft to move axially of the shaft, wedge elements between the disc and the radially enlarged portion of the driving shaft effective under relative rotation between the shafts to move the disc along the shaft on which it is mounted while the shafts remain axially fixed, the radially enlarged portions of said shafts and disc having aligned openings therethrough, pins extending through said openings to connect the driven shaft to the driving shaft for driving, said openings in the radially enlarged portion of said driving shaft being arcuate slots to allow relative rotation between the driven and driving shafts, and resilient means urging the disc toward the radially enlarged portion of the driving shaft with a force sufficient to cause the wedge elements to transmit a given torque while permitting relative rotation between the shafts when the given torque is exceeded.

2. Apparatus as defined in claim 1 in which the resilient means is a dished washer-like spring.

3. Apparatus as defined in claim 2 in which the washer-like spring surrounds each pin, and means on the pins holding the springs in force exerting position relative to the assembled parts of the coupling.

4. In a coupling, a driving shaft and a driven shaft arranged in an end-to-end relation and being aligned axially, a radially enlarged portion on each of said shafts and in facing relation to each other, a disc about the driving shaft and disposed adjacent the radially enlarged portion of the driving shaft to move axially of the shaft, wedge elements between the disc and the radially enlarged portion of the driving shaft effective under relative rotation between the shafts to move the disc along the shaft on which it is mounted while the shafts remain axially fixed, pins extending between and connecting the disc and the enlarged portion of the driven shaft, and resilient means operatively connected to said pins for urging the disc toward the radially enlarged portion of the driving shaft with a force sufficient to cause the wedge elements to transmit a given torque while permitting relative rotation between the shafts when the given torque is exceeded.

References Cited in the file of this patent

UNITED STATES PATENTS

| | | |
|---|---|---|
| 782,473 | Urtel et al. | Feb. 14, 1905 |
| 1,349,082 | Middleton | Aug. 10, 1920 |
| 1,587,724 | Harley | June 8, 1926 |
| 1,840,277 | Rall et al. | Jan. 5, 1932 |
| 1,883,164 | Vassakos | Oct. 18, 1932 |
| 1,956,733 | Small | May 1, 1934 |
| 2,983,121 | Naas | May 9, 1961 |